M. M. MUELLER.
STEERING GEAR LOCK.
APPLICATION FILED JUNE 7, 1917.

1,236,098.

Patented Aug. 7, 1917.

Inventor
Max M. Mueller
By
Attorneys

UNITED STATES PATENT OFFICE.

MAX M. MUELLER, OF CHICAGO, ILLINOIS.

STEERING-GEAR LOCK.

1,236,098.  Specification of Letters Patent.  Patented Aug. 7, 1917.

Application filed June 7, 1917. Serial No. 173,279.

*To all whom it may concern:*

Be it known that I, MAX M. MUELLER, a citizen of the United States, residing at Chicago, in the county of Cook and State of Illinois, have invented new and useful Improvements in Stearing-Gear Locks, of which the following is a specification.

This invention relates to devices for preventing the theft or unauthorized use of automobiles and other motor vehicles, and more particularly to devices of this kind which are applicable to the steering gear of the car for placing the same in such a position that the car cannot be steered.

The invention has for its object to provide a simple and efficient device of the kind stated, and to this end it consists in a novel combination and arrangement of parts to be hereinafter described and claimed.

In order that the invention may be better understood, reference is had to the accompanying drawing forming a part of this specification, and in said drawing, Figure 1 is a vertical section of the steering wheel assembly showing the invention applied thereto;

Figure 1:
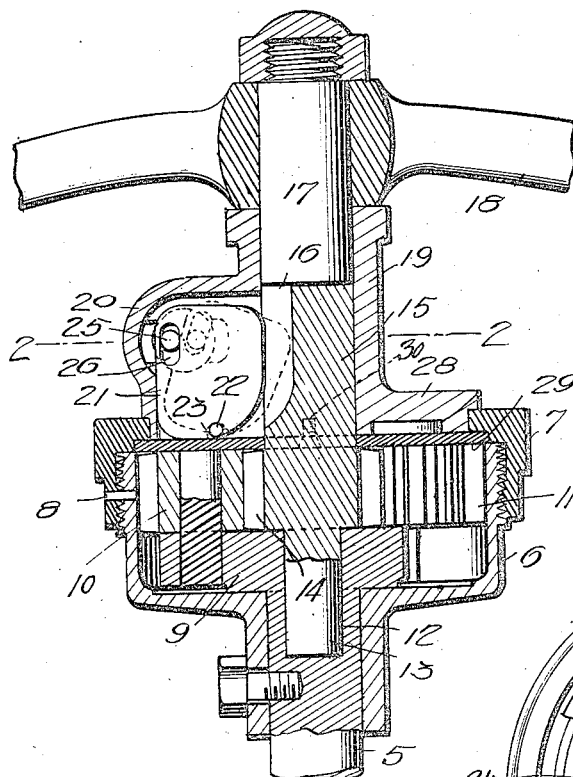
Figure 2:
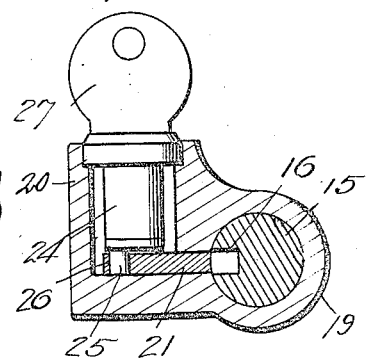
Fig. 2 is a cross section on the line 2—2 of Fig. 1.
Figure 4:
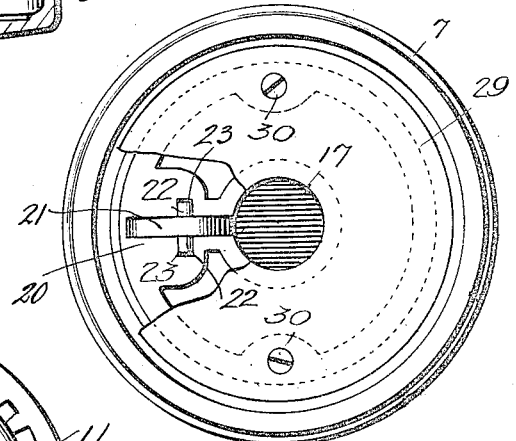
Fig. 4 is an inverted plan view of other parts.
Figure 3:
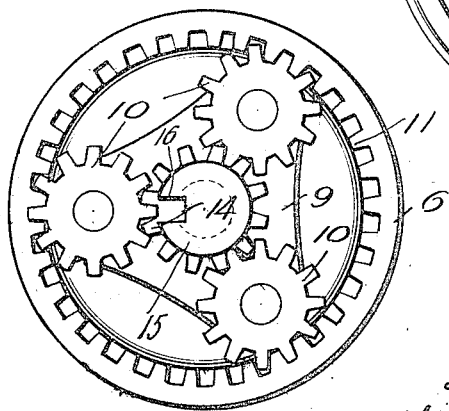
Fig. 3 is a plan view of certain parts of the assembly.

Referring specifically to the drawing, the invention is shown applied to the steering wheel assembly of the well-known Ford car. The steering post is shown at 5, the internal gear case at 6 and the cover of the latter at 7. The cover is screwed on the gear case, and it is also secured against removal by a pin 8, this being for the purpose of preventing unauthorized removal of the cover so that the locking device cannot be tampered with. At the top of the steering post 5 is a spider 9 carrying the planetary pinions 10 which are in mesh with the teeth 11 of the case 6. In the spider 9 and the upper end of the steering post 5 is an axial bore 12 in which seats a short shaft 13 depending from a drive pinion 14 which is in mesh with the pinions 10. From the top of the pinion 14 also extends a stub shaft 15 having in its side a keeper notch 16. In line with the shaft 15, and abutting thereagainst, is a short shaft 17 to which the steering wheel 18 is fixed.

The shaft 17 extends into and is made fast to a hub member 19 rotatably mounted on the cover 7, the latter being of special design to accommodate the hub member. The shaft 15 also extends into the hub member but it is loose therein so that said member can turn thereon. The adjacent ends of the shafts 15 and 17 abut.

The hub member 19 has on one side a housing 20 for a lock-controlled member for coupling the shaft 15 to said hub member. This lock-controlled coupling member is a swinging plate 21 seating in the housing opposite the notch 16 so that it may be swung to extend thereinto as shown dotted in Fig. 1. When this is done, the shaft 15 is locked to the hub member 19, and as the latter is fast on the shaft 17 of the steering wheel 18, it will be seen that the steering wheel is now coupled to the shaft 15 to operate the pinion 14 and through the planetary gearing actuate the steering post 5 to steer the car. However, when the plate 21 is retracted and withdrawn from the notch 16, the steering wheel turns freely without imparting motion to the steering post, and consequently the car cannot now be steered.

The plate 21 is pivotally mounted in the housing 20 by means of trunnions 22 extending from its sides and seating in bearing notches 23 in the walls of the housing.

The housing 20 carries a lock 24 having at the inner end of its barrel an off-center stud 25 extending into a slot 26 in the plate 21. Thus, when the lock barrel is turned by inserting the proper key 27, the plate 21 may be advanced or retracted for the purpose stated.

The hub member 19 has an enlarged base portion 28 seating in a central aperture in the top of the cover 7 and it is held against separation from the latter by a plate 29 seating in the cover beneath the top thereof and secured to the inner end of the hub base by screws or other suitable fasteners 30.

I claim:—

1. The combination of a steering post, a steering wheel, a shaft carrying the steering wheel, a hub fixed on said shaft, means for transmitting the motion of the steering wheel shaft to the steering post, said means including a shaft which extends loosely into the hub, and lock-controlled means for coupling the last mentioned shaft to the hub to turn therewith.

2. The combination of a steering post, a steering wheel, a shaft carrying the steering wheel, a drive pinion having a shaft extending therefrom, said pinion and its shaft being held against longitudinal movement, a series of planetary pinions carried by the steering post and in mesh with the drive pinion, an internal gear with which the planetary pinions mesh, a hub to which the steering wheel shaft is fixed and into which the pinion shaft passes and loosely seats, and a lock-controlled member for coupling the pinion shaft to the hub to turn therewith.

3. The combination of a steering post, a steering wheel, a shaft carrying the steering wheel, a drive pinion having a shaft extending therefrom, said pinion and its shaft being held against longitudinal movement, a series of planetary pinions carried by the steering post and in mesh with the drive pinion, an internal gear with which the planetary pinions mesh, a hub to which the steering wheel shaft is fixed and into which the pinion shaft passes and loosely seats, a lock-controlled member for coupling the pinion shaft to the hub to turn therewith, a housing carrying the internal gear, and a cap closing the housing and carrying the aforesaid hub, said hub being rotatably mounted on the cap.

In testimony whereof I affix my signature.

MAX M. MUELLER.